US008665308B2

(12) United States Patent
Benedeki et al.

(10) Patent No.: US 8,665,308 B2
(45) Date of Patent: Mar. 4, 2014

(54) PREMIUM COMMUNICATION SESSIONS

(75) Inventors: David Benedeki, Prague (CZ); Johnny Bigert, Tyreso (SE); Dmytro Izotov, London (GB); Ole Mahrt, London (GB); Risto Reinpold, Harjumaa (EE); Mikael Suvi, Harjumaa (EE)

(73) Assignee: Skype, Dublin (IE)

( * ) Notice: Subject to any disclaimer, the term of this patent is extended or adjusted under 35 U.S.C. 154(b) by 292 days.

(21) Appl. No.: 13/077,668

(22) Filed: Mar. 31, 2011

(65) Prior Publication Data

US 2012/0056972 A1 Mar. 8, 2012

(30) Foreign Application Priority Data

Sep. 2, 2010 (GB) .................................. 1014614.0

(51) Int. Cl.
*H04N 7/14* (2006.01)
(52) U.S. Cl.
CPC ...................................... *H04N 7/14* (2013.01)
USPC .................. 348/14.03; 348/14.08; 348/14.12; 379/201.02
(58) Field of Classification Search
CPC ........... H04M 3/42; H04N 7/14; H04L 12/14; H04L 20/06326; H04L 29/0636; H04L 29/06401; H04L 29/06414; H04L 29/06367
USPC .................... 348/14.01–14.16; 709/204, 206; 379/114.05, 114.2; 455/407, 405
See application file for complete search history.

(56) References Cited

U.S. PATENT DOCUMENTS

| 2001/0043571 | A1 | 11/2001 | Jang et al. |
| 2004/0029561 | A1 | 2/2004 | Holter et al. |
| 2007/0174400 | A1* | 7/2007 | Cai et al. .................. 709/206 |
| 2009/0116627 | A1 | 5/2009 | Ropolyi |
| 2010/0015945 | A1 | 1/2010 | Shuman et al. |
| 2011/0249073 | A1* | 10/2011 | Cranfill et al. ............ 348/14.02 |

FOREIGN PATENT DOCUMENTS

| EP | 1 835 710 A1 | 3/2006 |
| EP | 1835710 A1 * | 9/2007 |
| WO | WO 2007/087267 A2 | 8/2007 |

OTHER PUBLICATIONS

International Search Report for PCT/EP2011/065036, date of mailing Feb. 27, 2012.

\* cited by examiner

*Primary Examiner* — Melur Ramakrishnaiah
(74) *Attorney, Agent, or Firm* — Sonia Cooper; Jim Ross; Micky Minhas (57) ABSTRACT

Communication systems and methods for providing premium multiparty communication sessions between a plurality of callers. The plurality of callers may comprise an initiating caller who initiates the premium multiparty communication session but who does not have a status in the communication system which is recognized by an operator of the communication system for allowing the premium multiparty communication session to proceed; and a premium multiparty caller who has a status in the communication system which is recognized by the operator of the communication system such that the operator allows the premium multiparty communication session to proceed, wherein the premium multiparty caller is a different caller to the initiating caller. The premium multiparty caller funding the premium multiparty communication session may be transferred and assigned during communication sessions.

42 Claims, 6 Drawing Sheets

PREMIUM COMMUNICATION SESSIONS

RELATED APPLICATION

This application claims priority under 35 U.S.C. §119 or 365 to Great Britain Application No. 1014614.0, filed Sep. 2, 2010. The entire teachings of the above application are incorporated herein by reference.

FIELD OF THE INVENTION

The present invention relates to premium communication sessions, such as multiparty video communication sessions between a plurality of callers in a communication system.

BACKGROUND

Communication systems allow communication sessions, such as calls or instant messaging sessions, to occur between two or more users (or callers) in the communication system. As well as transferring audio data between the callers in a call, video data (or "image data") can also be transmitted between the callers in a communication session.

In one example, the communication system is a packet-based communication system which allows the user of a device, such as a personal computer, to communicate across a computer network such as the Internet. Packet-based communication systems include voice over Internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication.

The transmission of some types of data, e.g. video data, in a communication session may result in large quantities of data being transmitted, as compared to the amount of data transmitted when other types of data, e.g. audio data, is transmitted in a communication session. In some communication systems, callers may be required to have a different level of authorisation to engage in communication sessions involving the transmission of video data, as compared to that required to engage in communication sessions involving the transmission of only audio data. Authorisation for engaging in video communication sessions may be provided, for example, by an operator of the communication system. In one example, a caller can initiate audio communication sessions (i.e. communication sessions involving the transmission of audio data, but not video data) without being required to provide funds to the operator of the communication system, whereas in order for a caller to initiate other types of communication session, the caller may be required to provide funds to the operator of the communication system. By providing funds to the operator of the communication system, a caller can acquire a subscription status in the communication system which can be recognized by the operator such that the caller can engage in certain types of communication session for which a subscription status is required. For example the subscription status may be a premium video subscription status which allows a caller to initiate video calls between more than two callers over the communication system.

Figure 1:
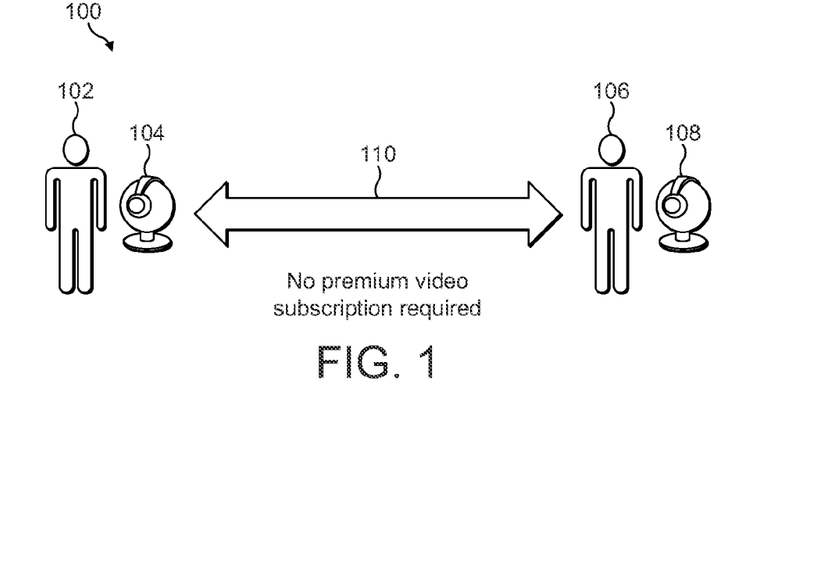
FIG. 1 shows a first prior art communication system.

For example, in one known communication system, when two callers are engaging in a one-to-one video call neither caller is required to have a premium video subscription status for the video call to proceed. This scenario is depicted in the communication system 100 shown in FIG. 1. Communication system 100 comprises a first caller 102 and a second caller 106 who can communicate over a communications network, such as the Internet. The first caller 102 is associated with a first webcam 104. The webcam 104 may be part of a first user device. The second caller 106 is associated with a second webcam 108, which may be part of a second user device. The first user 102 can transmit data to, and receive data from, the second user 106 over the communications network, as represented by arrow 110 in FIG. 1. For example, data may be transmitted between the first and second user devices over the communications network. The first and second webcams 104 and 108 are used for capturing image data for use in a video call between the first and second users 102 and 106. In the communication system 100, neither the first user 102 nor the second user 110 are required to have a premium video subscription status for the one-to-one video call between the two users to proceed.

Figure 2:
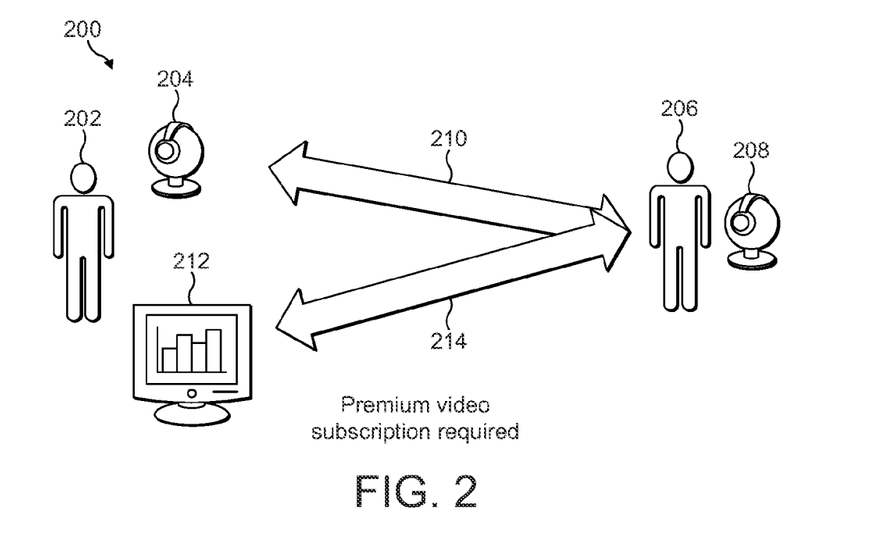
FIG. 2 shows a second prior art communication system.

However, if two users are engaging in a one-to-one video call with the additional functionality that there is screen sharing in the call along with the video data then in order to initiate the video call a user would be required to have a premium video subscription with the communication system. For example, the communication system 200 shown in FIG. 2 shows a first user 202 who is associated with a first webcam 204 and a first screen 212, and a second user 206 who is associated with a second webcam 208. The first and second users 202 and 206 can communicate with each other over a communications network. For example, the first webcam 204 and the first screen 212 may be part of a first user device whilst the second webcam 208 may be part of a second device, wherein the first and second user devices can transmit and receive data over the communications network. As shown by arrow 210 in FIG. 2 video data captured by the first and second webcams 204 and 208 can be transmitted between the first and second users 202 and 206. Furthermore, the arrow 214 represents that image data representing the image displayed on the first screen 212 can be transmitted between the first and second users 202 and 206. In this way the second user 206 is able to view the images that are being displayed on the first screen 212. It can be seen in FIG. 2 that the first user transmits two image data streams (represented by arrows 210 and 214). One of the image data streams (210) includes video data (which is image data) captured by the first webcam 204, whilst the other data stream (214) includes image data representing an, image displayed on the first screen 212.

The transmission of two image data streams from the first user 202 requires a high bandwidth and a high level of network resources. The operator of the exemplary communication system 200 has decided that in order to be provided with enough bandwidth and network resources for participating in the communication session shown in FIG. 2 at least one of the users 202 and 206 is required to have a premium video subscription. The communication session shown in FIG. 2 is a premium communication session.

Figure 3:
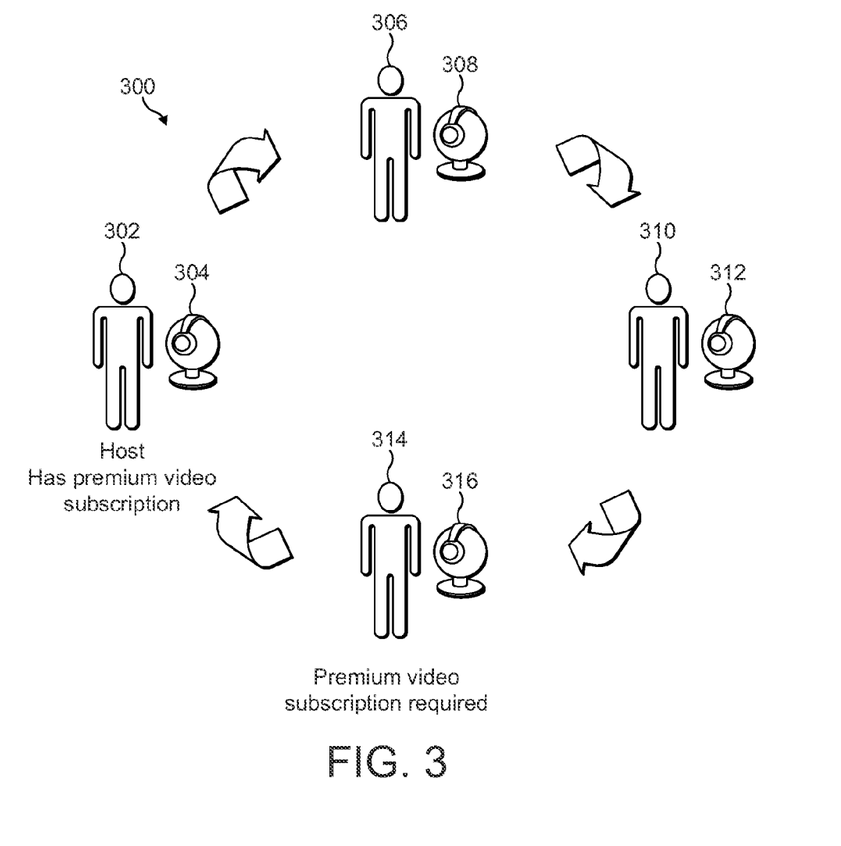
FIG. 3 shows a third prior art communication system.

In another example, a communication system 300 as shown in FIG. 3 includes four callers 302, 306, 310 and 314 which are engaging in a multiparty video communication session. In order to engage in a multiparty communication session (be it an audio or a video communication session) one of the callers initiates the communication session and acts as the host for the communication session. The first caller 302 is associated with a first webcam 304 for capturing video data for the first caller 302. The data captured by the first webcam 304 can be transmitted over a communications network (not shown in FIG. 3) to each of the other callers 306, 310 and 314. Similarly, the second caller 306 is associated with a second webcam 308 for capturing video data for the second caller 306. The data captured by the second webcam 308 can be transmitted over the communications network to each of the other callers 302, 310 and 314. Similarly, the third caller 310 is associated with a third webcam 312 for capturing video data for the third caller 310. The data captured by the third webcam 312 can be transmitted over the communications network to each of the other callers 302, 306 and 314. Similarly, the fourth caller 314 is associated with a fourth webcam 316 for capturing video data for the fourth caller 314. The data captured by the fourth webcam 316 can be transmitted over the communications network to each of the other callers 302, 306 and 310.

The host caller mixes the audio streams of the different callers in the communication session and transmits the mixed audio stream to each of the callers in the communication session. For example, the user terminal of the host caller 302 may be running client software for communicating over the communications network and the client software may receive and decode the audio streams from each of the other callers. The audio streams are mixed and transmitted to each of the other callers (306, 310 and 314) such that that each caller is provided with a mixed audio stream that includes the audio streams of each of the other callers, but does not include the audio stream of the caller for which the mixed stream is intended. Each of the mixed streams are then encoded and sent to the appropriate caller. The reason that a different stream needs to be mixed and encoded for each caller is that it is not desirable for a caller's own voice to be heard returning to the same caller. This is particularly the case since there is a delay incurred in the transmission of the audio stream, and in the decoding/encoding process, and the caller would therefore hear their own voice delayed by a short period of time, which would be disconcerting to the caller.

Since video data streams comprise many times more data than audio data streams, the video data streams are not mixed using the client of the host caller 302. Instead, the video data streams are sent to a server (not shown in FIG. 3) in the communication system 300, and the video data streams are retransmitted to each of the callers in the communication session from the server.

In order for the host caller 302 to initiate the multiparty video communication session shown in FIG. 3 the operator of the communication system 300 may require that he has a premium video subscription (as shown in FIG. 3). In this case, if the host caller 302 does not have a premium video subscription then he cannot initiate the multiparty video communication session shown in FIG. 3. Since the multiparty video communication session shown in FIG. 3 requires multiple video data streams to be transmitted over the communications network (and also uses a server to mix the video data streams) the operator of the communication system 300 requires that the host caller 302 has a premium video subscription before allowing the host caller 302 to initiate the multiparty video communication session.

Although FIG. 3 shows a multiparty video communication session between four callers, in the exemplary communications system 300 shown in FIG. 3, the host 302 would require a premium video subscription with the communication system 300 to initiate any multiparty video communication session involving more than two participants. As shown in FIG. 3, the host caller 302 is one of the participants in the multiparty video communication session. The other callers in the multiparty video communication session may be referred to as "non-hosts".

SUMMARY

The inventors of the present invention have realised that the requirements regarding subscriptions for engaging in premium communication sessions, such as multiparty video communication sessions, can advantageously be made more flexible than in the prior art. In particular, the inventors have realised that it can be advantageous for a caller to be able to benefit from having a subscription with the communication system even when he does not initiate a particular premium communication session (i.e. even when he is not the host of the particular premium communication session). The inventors have also realised that it can be advantageous for a premium communication session, such as a multiparty video call, to be maintained (i.e. not dropped) when the original funding party leaves the call.

The term "premium communication session" is used in this application to mean a communication session between callers which is allowed to proceed on the basis of one of the callers having a particular status in the communication system. This status may be a premium subscription status. Premium communication sessions may include "multiparty video communication sessions" which are communication sessions involving the transmission and reception of video data streams between at least three callers. This includes the case in which at least one participant caller is transmitting one video stream to more than one other caller, e.g. when a first caller (caller A) is in a call with three other callers (callers B, C and D) and caller A is transmitting video data to callers B and C but no other video data streams are transmitted. Premium communication sessions may also include video calls between two callers involving the transmission of at least three image data streams, such as when one of the callers is screen sharing in addition to transmitting video captured from his webcam. Premium communication sessions may also include a call between two callers wherein one caller transmits a video data stream whilst the other caller is screen sharing.

According to a first aspect of the invention there is provided a communication system configured to provide a premium multiparty communication session between a plurality of callers, the plurality of callers comprising: an initiating caller who initiates the premium multiparty communication session but who does not have a status in the communication system which is recognized by an operator of the communication system for allowing the premium multiparty communication session to proceed; and a premium multiparty caller who has a status in the communication system which is recognized by the operator of the communication system such that the operator allows the premium multiparty communication session to proceed, wherein the premium multiparty caller is a different caller to the initiating caller.

According to a second aspect of the invention there is provided a method of providing a premium multiparty communication session between a plurality of callers in a communication system, the method comprising an initiating caller initiating the premium multiparty communication session, wherein the plurality of callers comprises: the initiating caller who does not have a status in the communication system which is recognized by an operator of the communication system for allowing the premium multiparty communication session to proceed; and a premium multiparty caller who has a status in the communication system which is recognized by the operator of the communication system such that the operator allows the premium multiparty communication session to proceed, wherein the premium multiparty caller is a different caller to the initiating caller.

In preferred embodiments, the premium multiparty caller is a funding caller who acquired said status by providing funds to the operator of the communication system for allowing the premium multiparty communication session to proceed. The status may be a subscription status, such as a premium video subscription status.

By providing for the case in which the initiating caller of the multiparty video communication session is a different caller to the funding caller, the funding caller is able to use his subscription status with more flexibility. In particular, the funding caller is able to engage in premium communication sessions, such as multiparty video communication sessions, using his subscription status even when he has not initiated the communication session. This also means that a caller can initiate a multiparty video communication session without having a required status (e.g. without having the premium video subscription status) provided that one of the other callers in the multiparty video communication session does have the required status. The initiating caller may establish the premium communication session by requesting that an established non-premium multiparty communication session between the plurality of callers is converted into the premium multiparty communication session. Alternatively the initiating caller may establish the premium communication session by establishing the premium multiparty communication session including transmitting an indication of the plurality of callers to a server in the communication system, wherein the server determines that the premium multiparty caller has said status and on that basis that the premium multiparty communication session is to be allowed to proceed.

According to a third aspect of the invention there is provided a method of handling a communication session between a plurality of callers in a communication system, the method comprising: receiving a request from one of the plurality of callers to convert the communication session into a premium communication session; determining whether another one of the plurality of callers has a status which indicates that premium communication sessions are to be allowed to proceed; and if it is determined that said other one of the plurality of callers has said status, converting the communication session into a premium communication session.

According to a fourth aspect of the invention there is provided a communication system configured to handle a communication session between a plurality of callers, the communication system comprising: receiving means for receiving a request from one of the plurality of callers to convert the communication session into a premium communication session; determining means for determining whether another one of the plurality of callers has a status which indicates that premium communication sessions are to be allowed to proceed; and converting means for converting the communication session into a premium communication session if it is determined that said other one of the plurality of callers has said status.

Said other one of the plurality of callers who has said status is not necessarily the initiator of the call. It may be determined whether at least one of the callers in the communication session has permission to facilitate a premium communication session, (e.g. a multiparty video call). In preferred embodiments of the invention the status of the callers is a subscription status which can be used to provide permission for multiparty video communication sessions to proceed. The permission for a multiparty video communication session to proceed may be based on whether or not at least one caller in the multiparty video communication session has a valid subscription status to 'fund' the call. A caller with a suitable valid subscription status may be referred to as a funding caller.

Depending on the operator of the communication system, a communication session may be allowed to proceed without requiring any of the callers to have a particular subscription status if, for example, the communication session is a multi-party audio communication session (which involves no transmission of video data). However, if one of the callers then requests that the communication session is converted into a premium communication session, the operator of the communication system may require that at least one of the callers has a valid status for allowing premium communication sessions to proceed. The inventors have realised that it is not necessary for the caller who is requesting the conversion of the communication session into a premium communication session to necessarily be the caller who has the valid status for allowing premium communication sessions to proceed. In this way the status of another caller in the communication session can be used to allow the communication session to be converted into a premium communication session. In preferred embodiments, any participant will be able to convert an audio call to a video call, provided at least one participant on the call has the appropriate subscription status.

According to a fifth aspect of the invention there is provided a method of handling a premium communication session between a plurality of callers in a communication system, wherein a first of the plurality of callers is in a validating condition which indicates that the premium communication session is allowed to proceed, the method comprising: during the premium communication session, determining that the first caller is no longer in the validating condition; determining whether a second of the plurality of callers is in the validating condition which indicates that the premium communication session is allowed to proceed; and responsive to the determination that the first caller is no longer in the validating condition, if it has been determined that the second caller is in the validating condition, maintaining the premium communication session.

According to a sixth aspect of the invention there is provided a communication system configured to handle a premium communication session between a plurality of callers, wherein the communication system is configured to allow the premium communication session to proceed on the basis that a first of the plurality of callers is in a validating condition, the communication system comprising: first determining means for determining, during the premium communication session, that the first caller is no longer in the validating condition; and second determining means for determining whether a second of the plurality of callers is in the validating condition which indicates that the premium communication session is allowed to proceed, wherein the communication system is configured to maintain the premium communication session responsive to the determination that the first caller is no longer in the validating condition if it has been determined that the second caller is in the validating condition.

In preferred embodiments, for a caller to be in the validating condition the caller must be a participant in the premium communication session and must also have a status in the communication system which allows premium communication sessions to proceed (e.g. a premium video subscription status as described above). When a caller is in the validating condition and he has a subscription status which is being used to fund the premium communication session then the caller is a funding caller for the premium communication session.

The inventors have realised that if, during the premium communication session, the condition of the funding caller changes such that he is no longer in the validating condition the system can determine if there is another caller in the premium communication session who can fund the call. The condition of the funding caller may change from the validating condition if the funding caller leaves the premium communication session or if the status of the funding caller changes such that it no longer indicates that premium communication sessions are allowed to proceed, such as for example if the caller's subscription expires.

If there is another caller in the premium communication session who is in the validating condition when it is determined that the first caller is no longer in the validating condition then the premium communication session is allowed to proceed on the basis of that other caller's validating condition. However, if there are no callers in the validating condition in the premium communication session when it is determined that the first caller is no longer in the validating condition then the communication system may terminate the premium communication session. Alternatively, if there are no callers in the validating condition when it is determined that the first caller is no longer in the validating condition then the communication system may start a grace period of x minutes for which the premium communication session can continue before being dropped. However, if one of the callers in the premium communications session enters into the validating condition during the grace period then the premium communication session may be allowed to proceed. At the start of the grace period the communication system may notify all of the callers in the premium communication session that unless one of the callers enters into the validating condition before the end of the grace period then the premium communication session will be dropped. In order to enter into the validating condition the callers may be required to acquire a subscription status, for example by paying a subscription to the operator of the communication system.

There is described herein methods and systems for allowing funding callers to utilize their status in the communication system with more flexibility. This allows a greater number of premium communication sessions to proceed which is beneficial to both the operator of the communication system and to the users of the communication system. The inventors have made the realisations that the funding party for a premium communication session can be assigned and transferred during a communication session and that it is not necessary for the initiator of a premium communication session to be the caller with a suitable status for allowing multiparty premium sessions to proceed provided that one of the other callers in the premium communication session has the suitable status.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Preferred embodiments of the invention will now be described by way of example only. It will be apparent to a person skilled in the art that the invention is not limited by the features of the preferred embodiments described below, but is instead determined by the scope of the appendant claims. Various modifications may be made to the preferred embodiments described below without departing from the scope of the invention as would be apparent to a person skilled in the art.

Figure 4:
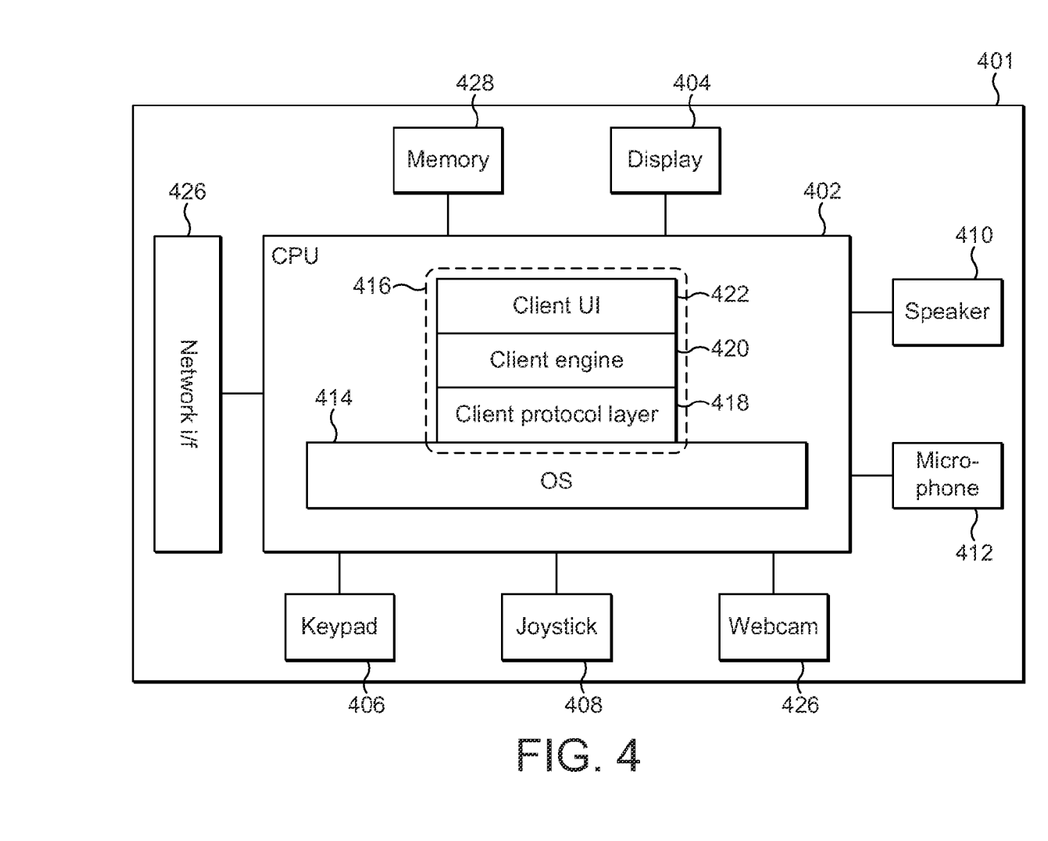
FIG. 4 shows a schematic representation of a user terminal according to a preferred embodiment.
Figure 5:
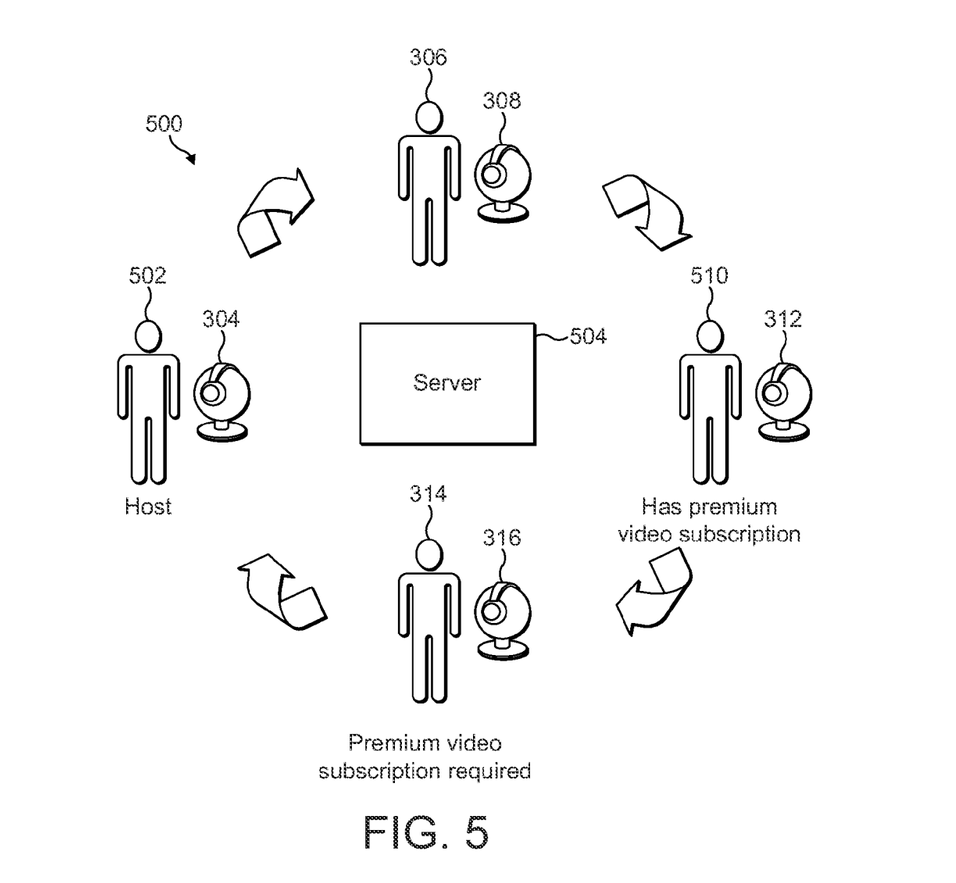
FIG. 5 shows a communication system according to a preferred embodiment.

With reference to FIGS. 4 and 5 there is now described a user terminal 401 and a communication system 500 according to preferred embodiments.

FIG. 5 shows a communication system 500 according to preferred embodiments. Communication system 500 is similar to communication system 300 of the prior art shown in FIG. 3 in that it comprises four callers who can all communicate with each other in a multiparty video communication session. However, in contrast to the communication system 300 shown in FIG. 3, the host caller 502 does not have a premium video subscription status in the communication system 500, and the caller 510 does have a premium video subscription status for allowing the multiparty video communication session to proceed. In the communication system 500 a multiparty video communication session is allowed to proceed on the basis of the premium video subscription of the caller 510 even though the host caller of the multiparty video communication session is a different caller (caller 502).

The communication system 500 is a packet-based communication system. For example, the communication system 500 could be a packet-based communication system that uses a peer-to-peer ("P2P") topology built on proprietary protocols. To enable access to a peer-to-peer system, the caller must execute P2P client software provided by a P2P software provider on their user terminal, and register with the P2P system. When the caller registers with the P2P system the client software is provided with a digital certificate from a server. Once the client software has been provided with the certificate, communication can subsequently be set up and routed between callers of the P2P system without the further use of a server. In some other embodiments, the communication system 500 is a different type of communication system that does not use a P2P topology, and instead uses a server based system for handling communication sessions as is known in the art.

FIG. 4 illustrates a detailed view of a user terminal 401 on which is executed client software for communicating over the communication system 500 as described above. The user terminal 401 can be used by a caller (e.g. the host caller 502) for communicating over the communication system 500 with the other callers (306, 510 and 314) in the communication system 500. The user terminal 401 comprises a central processing unit ("CPU") 402, to which is connected a display 404 such as a screen, input devices such as a keypad (or a keyboard) 406, a pointing device such as a joystick (or mouse) 408 and a webcam 426 for capturing video data. The display 404 may comprise a touch screen for inputting data to the CPU 402. An output audio device 410 (e.g. a speaker) and an input audio device 412 (e.g. a microphone) are connected to the CPU 402. The display 404, keypad 406, joystick 408, webcam 426, output audio device 410 and input audio device 412 are integrated into the user terminal 401. In alternative user terminals one or more of the display 404, the keypad 406, the joystick 408, webcam 426, the output audio device 410 and the input audio device 412 may not be integrated into the user terminal 410 and may be connected to the CPU 402 via respective interfaces. One example of such an interface is a USB interface. The CPU 402 is connected to a network interface 426 such as a modem for communication with a communications network for communicating over the communication system 500. The network interface 426 may be integrated into the user terminal 401 as shown in FIG. 4. In alternative user terminals the network interface 426 is not integrated into the user terminal 401.

FIG. 4 also illustrates an operating system ("OS") 414 executed on the CPU 402. Running on top of the OS 414 is a software stack 416 for the client. The software stack shows a client protocol layer 418, a client engine layer 420 and a client user interface layer ("UI") 422. Each layer is responsible for specific functions. Because each layer usually communicates with two other layers, they are regarded as being arranged in a stack as shown in FIG. 4. The operating system 414 manages the hardware resources of the computer and handles data being transmitted to and from the network via the network interface 426. The client protocol layer 418 of the client software communicates with the operating system 414 and manages the connections over the communication system. Processes requiring higher level processing are passed to the client engine layer 420. The client engine 420 also communicates with the client user interface layer 422. The client engine 420 may be arranged to control the client user interface layer 422 to present information to the user via a user interface of the client and to receive information from the user via the user interface.

FIG. 5 also shows that a server 504 is present in the communication system 500. In preferred embodiments, audio data streams are mixed by the host caller 502 (the call initiator) as described above, and sent from the host caller 502 to each of the other callers (306, 510 and 314) in the communication session. The video data streams are retransmitted from the server 504 to each of the callers in the multiparty video communication session. Other embodiments are also possible. For example, the data streams may be transmitted using a mesh architecture in which different routing options are available for transmitting the data streams through the network. In another alternative embodiment, the audio data streams are mixed at the server 504 instead of by the host caller 502.

The server 504 is used to store subscription information relating to the status of the callers in the multiparty video communication session. The status of each of the callers in the communication system 500 can be monitored and any changes to the status of the callers are stored in the server 504 in real-time. In this way the server 504 can maintain an up to date record of the status of each of the callers in the communication system 500. Therefore, the server 504 can be used to determine whether the status of the callers in a multiparty video communication session is sufficient to allow the multiparty video communication session to proceed (e.g. that at least one of the callers in the multiparty video communication session has a status indicating that multiparty video communication sessions are to be allowed to proceed).

Before a communication session has started the callers in the communication system 500 are in a pre-call state. A caller (e.g. host caller 502) can select a group of callers with which to start a communication session. When the host caller 502 selects a group of three or more callers in total (including the host caller himself), a 'Group Video Call' button will be displayed on the display 404 of the user terminal 401 of the host caller 502. The Group Video Call button will be displayed on the display 404 regardless of the premium video subscription status of the callers in the selected group.

However, multiparty video calls (e.g. video calls between three or more participants, including the host) require a premium video subscription in the communication system 500. Therefore when the host caller 502 clicks on the Group Video Call button, the system will check whether the host caller 502 has a premium video subscription status which is sufficient for proceeding with the multiparty video call. The subscription status required may vary depending upon the number of callers selected to be in the multiparty video communication session. The subscription status information may be stored locally at the host caller's user terminal 401, or on the server 504 as described above. Where the host caller 502 initiates a multiparty video communication session that is within the limits of his premium video subscription status, no additional communication will be displayed to the host caller 502 and the multiparty video communication session will proceed. However, if the host caller 502 does not have a premium video subscription status sufficient for the multiparty video communication session to proceed, then the multiparty video communication session may not be allowed to proceed. In alternative embodiments, the multiparty communication session may be connected as a multiparty audio communication session, but the video will not start. The multiparty audio communication session is allowed to proceed because the communication system 500 does not require any of the callers in a multiparty audio communication session to have a particular subscription status before allowing the multiparty audio communication session to proceed. This is because the transmission of an audio data stream over the network requires much less bandwidth and network resources than the transmission of a video data stream. In other embodiments, the host caller 502 may transmit a list of the participants intended to be in the multiparty video communication session to the server 504. The server 504 may then determine whether any of the participants in the list have a suitable subscription status for allowing the multiparty video communication session to proceed, and if any of the participants do have a suitable subscription status then the multiparty video communication session may be allowed to proceed.

If a caller who has been included in a multiparty video communication session does not have the appropriate software or hardware for participating in video calls then they are able to participate in the multiparty communication session on an audio basis only. This allows callers to join in a multiparty communication session even though they do not have the required equipment for transmitting and receiving video data streams and even though the other callers in the communication session are transmitting video data streams in the multiparty communication session.

A video data stream transmitted in a multiparty video communication session may comprise for example (i) video data captured from a caller's webcam, or (ii) image data representing images displayed on a caller's screen. When the video data stream comprises video data representing images displayed on a caller's screen the communication session can include screen sharing of the caller's screen.

Whilst a multiparty audio call is in progress between three or more participant callers, a 'Convert to Video Call' button will be displayed on the display of a user terminal of each of the callers. In one embodiment the 'Convert to Video Call' button will be displayed to the callers in the multiparty audio call regardless of the permission status of the participant callers on the call. In an alternative embodiment of the invention the 'Convert to Video Call' button will only be displayed to the callers in the multiparty audio call if it is determined that one of the participant callers has the required permission status for converting the multiparty audio call into a multiparty video call. Any of the participant callers in the multiparty audio call will be able to convert the multiparty audio call to a multiparty video call, provided at least one of the participant callers on the multiparty audio call has the appropriate subscription status for allowing multiparty video calls (e.g. a premium video subscription status).

Figure 6:
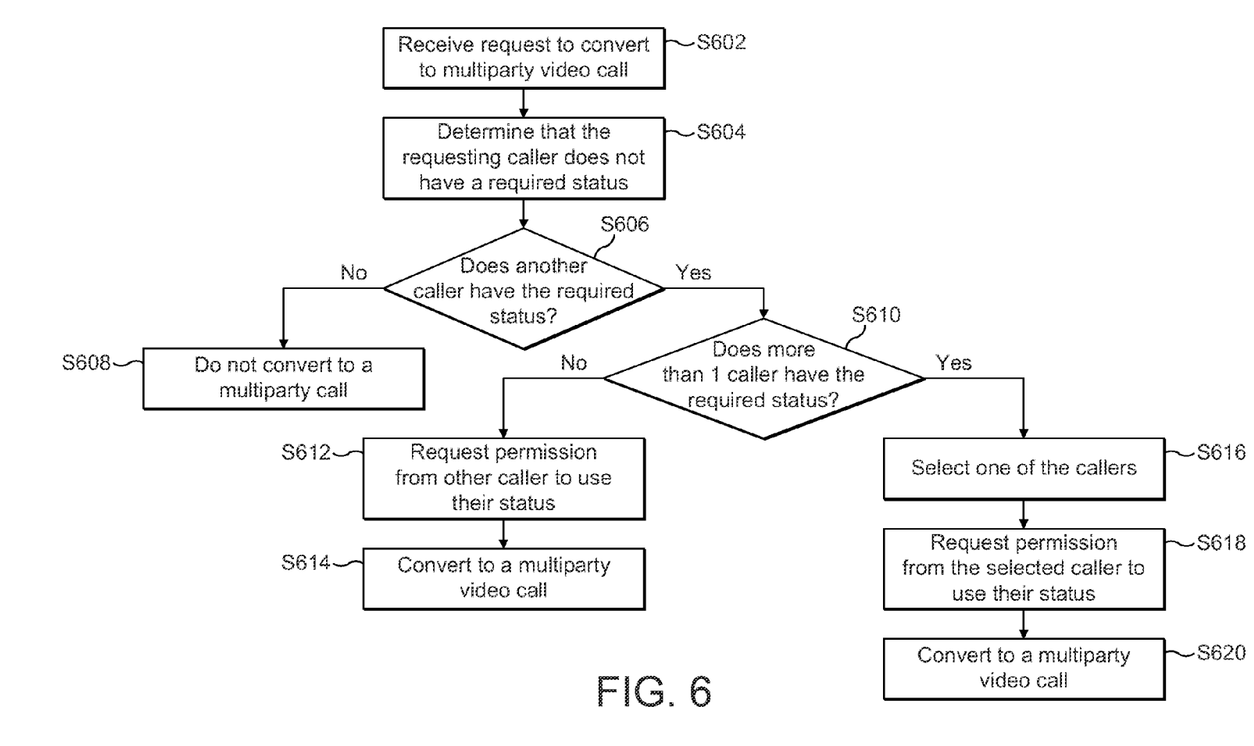
FIG. 6 is a flow chart for a process of handling a multiparty communication session.

FIG. 6 shows a flowchart for a process of handling a multiparty communication session. Initially the multiparty communication session is not a multiparty video communication session. For example, it may be a multiparty audio call or a multiparty instant messaging communication session. Then in step S602 a request is received from one of the callers in the multiparty communication session for converting the multiparty communication session into a multiparty video communication session. Any of the callers in the original multiparty communication session can attempt to convert the multiparty communication session into a multiparty video communication session, for example by clicking on the Convert to Video Call button displayed on the screen of their user terminal.

After the request has been received (e.g. after the Convert to Video Call button has been clicked), in step S604 it is determined that the requesting caller does not have a required status for allowing multiparty video communication sessions to occur (e.g. he does not have the required premium video subscription status). Note that if the requesting caller does have the required status then the multiparty video communication session can proceed on the basis of the requesting caller's status.

In step S606 it is determined whether any of the participant callers in the original multiparty communication session has a valid subscription status sufficient for converting the multiparty communication session into a multiparty video communication session. In a preferred embodiment of the invention, the determination in step S606 comprises transmitting a message to the server 504 to check the subscription status of participants in the multiparty communication session. The message indicates each participant caller of the multiparty communication session. In response the server 504 looks up the subscription status of each participant of the multiparty communication session on a database containing subscription information stored at the server 504.

If the server 504 determines that there are no participants able to fund a multiparty video call then the server transmits a reply message to the requesting caller indicating that the multiparty video call cannot start. Then, as shown in step S608, the multiparty communication session is not converted into a multiparty video communication session, and instead may be maintained as a multiparty communication session which does not involve the transmission of video data streams. When none of the callers in the multiparty communication session have the required subscription status for allowing a multiparty video communication session, the requesting caller will be shown a pop-up message on the display of his user terminal indicating that this is the case to thereby explain why a multiparty video call cannot proceed. The caller could also be informed about ways in which subscription may be purchased such that the caller could acquire the required subscription status for allowing multiparty video communication sessions to proceed.

However, if there is one participant caller (a "funding caller") that is able to fund multiparty video communication sessions (due to their status) then the server 504 may, in some embodiments, transmit a reply message to the requesting caller indicating that the multiparty video call may start, and the multiparty video communication session may be allowed to proceed. In these embodiments, no additional communication will be displayed to the requesting caller and the multiparty video communication session will commence. In some embodiments permission to use the status of the funding caller is requested from the funding caller before proceeding with the multiparty video communication session, and the multiparty video communication session can only proceed on the basis of the funding caller's subscription status if the funding caller provides permission to do so.

In other embodiments, as shown in FIG. 6, if there is one participant caller that is able to fund multiparty video communication sessions (due to their status) then the method may proceed by passing to step S610 in which it is determined whether more than one caller in the original multiparty communication session has the required status for converting the communication session into a multiparty video communication session. This determination is performed by the server 504. If only one caller has the required status then the method passes to step S612 in which permission is requested from the caller with the required status for using his status to allow the multiparty video communication session to commence. The permission may be requested by way of sending a message to the caller with the required status with the request in the message. If the caller with the required status does not provide permission to use his status then the communication session cannot be converted into a multiparty video communication session on the basis of his status and so the communication session is not converted into a multiparty video communication session. However, if the caller with the required status provides his permission then the multiparty communication session is converted into a multiparty video communication session in step S614.

If it is determined in step S610 that more than one caller in the multiparty communication session has the required status then the method passes to step S616 in which one of those callers is selected. The selection may be a random selection. Alternatively, the selection may be based on the particular status of the callers. For example, a caller with a subscription status that allows unlimited multiparty video calls may be selected in preference to a caller with a subscription status which indicates that they have a prepaid balance for funding multiparty video calls. When one of the callers has been selected in step 516 the method proceeds to step S618 in which permission is requested from the selected caller for using his status to allow the multiparty video communication session to commence. The permission may be requested by way of sending a message to the selected caller with the request in the message. If the selected caller does not provide permission to use his status then the communication session cannot be converted into a multiparty video communication session on the basis of his status and so the communication session is not converted into a multiparty video communication session. However, if the selected caller provides his permission then the multiparty communication session is converted into a multiparty video communication session in step S620.

In order to ensure the privacy of each participant of the original multiparty communication session, the caller that converts a multiparty audio call to a multiparty video call will not be able to switch on the video stream for each participant. Instead each participant must separately choose to start transmitting a video data stream in order for a video data stream to be transmitted from that participant.

A caller may change his status during a communication session. If this happens then the status stored in the server 504 is updated in real-time. A caller may for example change his status by successfully subscribing via a website of the communication system 500. If a caller has updated his status during a communication session their subscription status stored on the database at the server 504 will be updated immediately such that they will be able to convert the communication session to a multiparty video communication session immediately thereafter.

Figure 7:
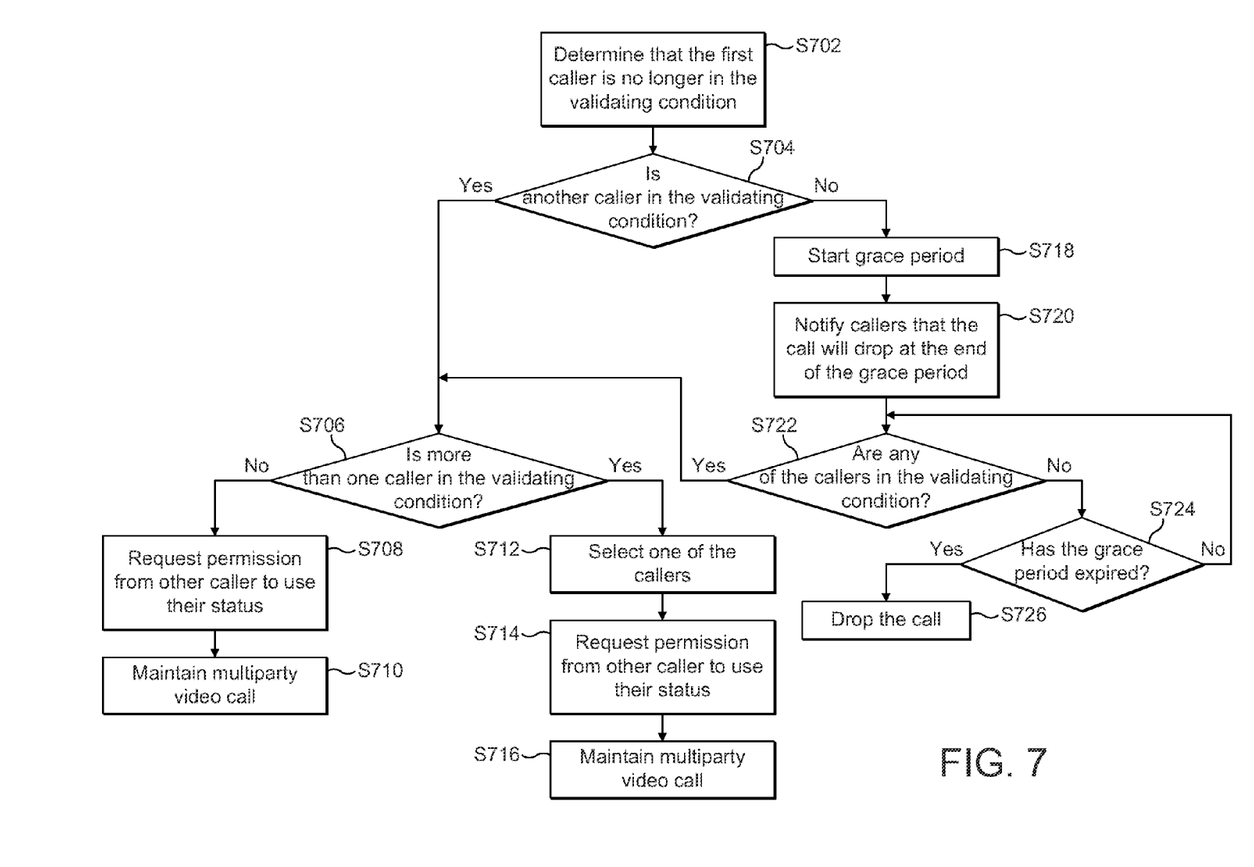
FIG. 7 is a flow chart for a process of handling a multiparty video communication session.

FIG. 7 shows a flowchart for a process of handling a multiparty video communication session. A first caller, for example caller 510 shown in FIG. 5, is initially funding the multiparty video communication session. In other words, the multiparty video communication session is allowed to proceed on the basis of the subscription status of the first caller 510. In this sense the first caller 510 is considered to be in a "validating condition" meaning that he is in a condition which allows the multiparty video communication session to proceed. In order to be in the validating condition the first caller 510 must be a participant in the multiparty video communication session and must also have a status which is recognised in the communication system 500 as indicating that multiparty video communication sessions are to be allowed to proceed. For example, the first caller 510 may have a premium video subscription status.

However, in step S702 it is determined that the first caller 510 is no longer in the validating condition. In order to perform this determination the server 504 may monitor changes to the callers participating in the multiparty video communication session by monitoring a heart beat message provided from the host caller 502. The host caller 502 is arranged to transmit a heart beat message to the server 504 throughout the multiparty video communication session indicating the current participants in the multiparty video communication session. The server 504 may also monitor the subscription status of the participants (including the funding caller 510) throughout the multiparty video communication session. In one embodiment the server 504 may query a subscription database to determine the funds available to the funding caller 510 on receipt of each heartbeat message from the host caller 502.

If the server 504 determines that the first caller 510 has left the multiparty video communication session or that the status of the first caller 510 has changed such that he no longer has a status which indicates that multiparty video communication sessions are to be allowed to proceed then it is determined in step S702 that the first caller 510 is no longer in the validating condition, and the method passes to step S704.

In step S704 it is determined whether there is another caller in the multiparty video communication session who is in the validating condition (i.e. participating in the multiparty video communication session and having a sufficient subscription status for allowing multiparty video communication sessions to proceed). In this way the system will check for the presence of a caller in the multiparty video communication session having a sufficient subscription status (i.e. an identical, or higher, subscription status than that originally held by the first caller 510) for allowing the multiparty video communication session to proceed. In some embodiments, if there is another caller in the validating condition then the multiparty video communication session continues without any visible system activity. In some embodiments permission to use the status of the other caller is requested from the other caller before proceeding with the multiparty video communication session, and the multiparty video communication session can only proceed on the basis of the other caller's subscription status if the other caller provides permission to do so.

In other embodiments, as shown in FIG. 7, if there is another caller in the validating condition then the method proceeds with step S706 in which it is determined whether there is more than one caller is in the validating condition. This determination is performed by the server 504. If only one caller is in the validating condition then the method passes to step S708 in which permission is requested from the caller who is in the validating condition for using his status to allow the multiparty video communication session to be maintained. The permission may be requested by way of sending a message to the caller who is in the validating condition with the request in the message. If the caller who is in the validating condition does not provide permission to use his status then the multiparty video communication session cannot be maintained on the basis of his status and so the multiparty video communication session is not maintained. However, if the caller who is in the validating condition provides his permission then the multiparty video communication session is maintained in step S710.

If it is determined in step S706 that more than one caller in the multiparty video communication session is in the validating condition then the method passes to step S712 in which one of those callers is selected. The selection may be a random selection. Alternatively, the selection may be based on the particular status of the callers. For example, a caller with a subscription status that allows unlimited multiparty video calls may be selected in preference to a caller with a subscription status which indicates that they have a prepaid balance for funding multiparty video calls. When one of the callers has been selected in step the method proceeds to step S714 in which permission is requested from the selected caller for using his status to allow the multiparty video communication session to be maintained. The permission may be requested by way of sending a message to the selected caller with the request in the message. If the selected caller does not provide permission to use his status then the multiparty video communication session cannot be maintained on the basis of his status and so the multiparty video communication session is not maintained. However, if the selected caller provides his permission then the multiparty video communication session is maintained in step S716.

Returning to step S704, if it is determined that there is not another caller who is in the validating condition (i.e. who is participating in the multiparty video communication session and who has a sufficient subscription status for allowing multiparty video communication sessions to proceed) then the multiparty video communication session is not allowed to proceed unless the condition of at least one caller becomes the validating condition.

In some embodiments, if it is determined that there is not another caller who is in the validating condition then the multiparty video communication session is dropped. The communication session may be dropped entirely or may be converted into a multiparty communication session which does not involve the transmission of video data streams, e.g. a multiparty audio communication session or a multiparty instant messaging communication session.

However, in other embodiments, as shown in FIG. 7, if it is determined that there is not another caller who is in the validating condition then the method passes to step S718 in which a grace period of x minutes is started. In step S720 the callers in the multiparty video communication session are notified that a subscription status (e.g. a premium video subscription status) is required to continue with the multiparty video communication session and that the multiparty video communication session will be dropped at the end of the grace period unless one of the callers successfully acquires a sufficient subscription status before the end of the grace period.

Then in step S722 it is determined whether any of the callers are in the validating condition. If it is still the case that none of the callers are in the validating condition then the method passes to step S724 in which it is determined whether the grace period of x minutes has expired. If the grace period has not yet expired then the method passes back to step S722. This cycle of steps S722 and S724 will continue until either one of the callers enters into the validating condition or the grace period expires.

If the grace period expires before any of the callers enters into the validating condition then the method will pass to step S726 in which the multiparty video communication session is dropped. In other embodiments, instead of dropping the multiparty video communication session, the multiparty video communication session may instead be converted into a multiparty communications session which does not involve the transmission of video data streams, e.g. a multiparty audio communication session or a multiparty instant messaging communication session.

However, if one of the callers enters into the validating condition before the grace period expires then the multiparty video communication session may be allowed to be maintained on the basis of the new validating condition of the one of the callers. In some embodiments, if one of the callers enters into the validating condition before the grace period expires then the multiparty video communication session is maintained. In some embodiments permission to use the status of the caller is requested from the caller before proceeding with the multiparty video communication session, and the multiparty video communication session can only proceed on the basis of the caller's validating condition if the caller provides permission to do so.

In other embodiments, as shown in FIG. 7, if one of the callers enters into the validating condition before the grace period expires then the method will pass to step S706. The method then proceeds as described above whereby permission is requested from the caller before maintaining the multiparty video communication session on the basis of their subscription status.

It can therefore be seen that by following the method shown in FIG. 7, if a participant successfully acquires a sufficient subscription status before the end of the grace period, then the multiparty video communication session will continue as it was before the determination that the first caller 510 was no longer in the validating condition. If no participant acquires a sufficient subscription status for the multiparty video communication session before the end of the grace period, then the video aspect of the multiparty video communication session will drop. Any payment received whilst the multiparty video communication session is proceeding must be cleared before the subscription status is available to be used as the basis for allowing the multiparty video communication session to proceed.

It can be seen in the embodiments described above that multiparty video communication sessions can be allowed to proceed on the basis of the subscription status of callers in the multiparty video communication session with more flexibility than in the prior art. This provides a much more user-friendly communication system and promotes use of the communication system for engaging in multiparty video communication sessions.

A number of factors may be considered in selecting a funding caller to fund a multiparty video communication session. In some embodiments, a potential funding caller is any participant in a multiparty video communication session with a subscription status that allows unlimited multiparty video communication sessions. In other embodiments a potential funding caller is any participant in a multiparty video communication session who has credit in a prepaid balance with the operator of the communication system. In further embodiments a potential funding caller is any participant in a multiparty video communication session with sufficient funds for the allowing the multiparty video communication session to proceed (e.g. a subscriber or a caller with credit) and who has previously indicated that he is willing to fund multiparty video communication sessions.

As described above, where there is more than one potential caller for funding the multiparty video communication session, the server may select the funding caller at random or may transmit a request to a selected caller to confirm that the he is happy to fund the multiparty video communication session.

When a funding caller is selected by the system a record of the start billing event is created. When the system determines from the heart beat message that the funding caller is no longer a participant of the call, or that the call has ended, a record of the end billing event is created. In this way the funding caller can be charged correctly for funding the multiparty video communication session. The funds required for the multiparty video communication session may also depend upon the number of callers in the multiparty video communication session. The funds required for the multiparty video communication session may also depend upon the amount of data transmitted over the communication system during the multiparty video communication session. The funds required for the multiparty video communication session may also depend upon other factors as would be apparent to a person skilled in the art.

In the preferred embodiments described above for a caller to acquire a required status for allowing multiparty video communication sessions to proceed they are required to provide funds to the operator of the communication system. In other embodiments, a caller may acquire the status in other ways. For example, some callers may be granted the status without providing any funds to the operator of the communication system for reasons such as that they are a particularly frequent user of the communication system or that they have administrator rights in the communication system.

While this invention has been particularly shown and described with reference to preferred embodiments, it will be understood to those skilled in the art that various changes in form and detail may be made without departing from the scope of the invention as defined by the appendant claims.

The invention claimed is:

1. A method of handling a communication session between a plurality of callers in a communication system, the method comprising:
   receiving a request from one of the plurality of callers to convert the communication session into a premium communication session;
   determining whether one of the plurality of callers, other than a host caller associated with establishing the communication session, has a status which indicates that premium communication sessions are to be allowed to proceed; and
   responsive to determining that said other one of the plurality of callers has said status, converting the communication session into a premium communication session.

2. The method of claim 1 further comprising determining that said one of the plurality of callers does not have a status which indicates that premium communication sessions are to be allowed to proceed.

3. The method of claim 1 wherein the premium communication session comprises one of:
   a multiparty video call between the plurality of callers;
   a one-to-one video call wherein the method comprises transmitting at least three image data streams between the plurality of callers; or
   a one-to-one video call wherein the method comprises transmitting two image data streams wherein one of the image data streams is a video data stream and the other of the image data streams is a screen sharing data stream.

4. The method of claim 1 further comprising:
determining that more than one of the plurality of callers has a status which indicates that premium communication sessions are to be allowed to proceed.

5. The method of claim 4 further comprising selecting one of said more than one of the plurality of callers and using the status of said selected caller to allow the premium communication session to proceed.

6. The method of claim 5 further comprising requesting permission from the selected caller to use the status of said selected caller for allowing the premium communication session to proceed.

7. The method of claim 1 further comprising monitoring the status of the plurality of callers throughout the premium communication session.

8. The method of claim 1 further comprising storing the status of each of the plurality of callers at a server in the communication system.

9. The method of claim 8 further comprising updating the status of the plurality of callers stored at the server in real time.

10. The method of claim 8 wherein determining whether another one of the plurality of callers has a status which indicates that premium communication sessions are to be allowed to proceed further comprises checking the status of said other one of the plurality of callers stored at the server.

11. The method of claim 1 further comprising:
transmitting a video data stream, from said one of the plurality of callers requesting to convert the communication session into a premium communication session, in the premium communication session.

12. The method of claim 11 further comprising:
only transmitting the video data stream, from said one of the plurality of callers, in the premium communication session if said one of the plurality of callers gives permission.

13. The method of any of claim 1 wherein image data is transmitted between the plurality of callers in the premium communication session, said image data either image data captured using a webcam, or image data representing an image displayed on a caller's screen.

14. A communication system configured to handle a communication session between a plurality of callers, the communication system comprising:
receiving means for receiving a request from one of the plurality of callers to convert the communication session into a premium communication session, the plurality of callers including a host caller associated with initiating the communication session;
determining means for determining whether the host caller has a status which indicates that premium communication sessions are to be allowed to proceed;
determining means for determining, responsive to determining the host caller does not have the status which indicates that premium communication sessions are to be allowed to proceed, whether another one of the plurality of callers has a status which indicates that premium communication sessions are to be allowed to proceed; and
converting means for converting the communication session into a premium communication session if it is determined that said host caller or said another one of the plurality of callers has said status.

15. The communication system of claim 14 wherein said another one of the plurality of callers is a funding caller who acquired said status by providing funds to an operator of the communication system for allowing premium communication sessions to proceed.

16. The communication system of claim 14 wherein said status is a premium subscription status.

17. The communication system of any of claim 14 further comprising a server for storing the status of each of the plurality of callers.

18. The communication system of claim 14 wherein the determining means are further configured for determining that said one of the plurality of callers does not have a status which indicates that premium communication sessions are to be allowed to proceed.

19. The communication system of claim 14 wherein premium communication session comprises one of:
a multiparty video call between the plurality of callers;
a one-to-one video call, wherein the communication system further comprises transmitting means for transmitting at least three image data streams between the plurality of callers; or
a one-to-one video call wherein the communication system further comprises transmitting means for transmitting two image data streams, wherein one of the image data streams is a video data stream and the other of the image data streams is a screen sharing data stream.

20. The communication system of claim 14 further comprising:
determining means for determining that more than one of the plurality of callers has a status which indicates that premium communication sessions are to be allowed to proceed.

21. The communication system of claim 20 further comprising selecting means for selecting one of said more than one of the plurality of callers and using the status of said selected caller to allow the premium communication session to proceed.

22. The communication system of claim 21 further comprising requesting means for requesting permission from said selected caller to use the status of the selected caller for allowing the premium communication session to proceed.

23. The communication system of claim 14 further comprising monitoring means for monitoring the status of the plurality of callers throughout the premium communication session.

24. The communication system of claim 14 further comprising storing means for storing the status of each of the plurality of callers at a server in the communication system.

25. The communication system of claim 24 further comprising updating means for updating the status of the plurality of callers stored at the server in real time.

26. The communication system of claim 24 wherein the determining means for determining whether another one of the plurality of callers has a status which indicates that premium communication sessions are to be allowed to proceed further comprises checking the status of said other one of the plurality of callers stored at the server.

27. The communication system of claim 14 further comprising transmitting means for transmitting a video data stream, from said one of the plurality of callers requesting to convert the communication session into a premium communication session, in the premium communication session.

28. The communication system of claim 27 wherein the transmitting means for transmitting the video data stream is further configured to only transmit the video data stream in the premium communication session if said other one of the plurality of callers gives permission.

29. The communication system of claim 14 wherein the transmitting means are further configured to transmit image data between the plurality of callers in the premium communication session, wherein said image data is either image data captured using a webcam, or image data of an image displayed on a caller's screen.

30. One or more computer-readable storage memory devices comprising processor-executable instructions which, responsive to execution by at least one processor, are configured to:
   receive, from one of a plurality of callers in a communication system, a request to convert a communication session between the plurality of callers into a premium communication session;
   determine whether another one of the plurality of callers has a status indicating that premium communication sessions are to be allowed to proceed;
   responsive to determining that said another one of the plurality of callers has said status, request permission from said determined another one of the plurality of callers to use said status to convert the communication session into a premium communication session; and
   responsive to receiving permission from said determined another one of the plurality of callers, convert the communication session into a premium communication session.

31. The one or more computer-readable storage memory devices of claim 30, the processor-executable instructions further configured to determine that said another one of the plurality of callers does not have a status which indicates that premium communication sessions are to be allowed to proceed.

32. The one or more computer-readable storage memory devices of claim 30, wherein the premium communication session comprises one of:
   a multiparty video call between the plurality of callers;
   a one-to-one video call configured to transmit at least three image data streams between the plurality of callers; or
   a one-to-one video call configured to transmit two image data streams, wherein one of the image data streams is a video data stream and the other of the image data streams is a screen sharing data stream.

33. The one or more computer-readable storage memory devices of claim 30, the processor-executable instructions further configured to:
   determine that more than one of the plurality of callers has a status which indicates that premium communication sessions are to be allowed to proceed.

34. The one or more computer-readable storage memory devices of claim 33, the processor-executable instructions further configured to select one of said more than one of the plurality of callers and using the status of said selected caller to allow the premium communication session to proceed.

35. The one or more computer-readable storage memory devices of claim 30, the processor-executable instructions further configured to monitor the status of the plurality of callers throughout the premium communication session.

36. The one or more computer-readable storage memory devices of claim 30, the processor-executable instructions further configured to store the status of each of the plurality of callers at a server in the communication system.

37. The one or more computer-readable storage memory devices of claim 36, the processor-executable instructions further configured to update the status of the plurality of callers stored at the server in real time.

38. The one or more computer-readable storage memory devices of claim 36, wherein the processor-executable instructions to determine whether another one of the plurality of callers has a status which indicates that premium communication sessions are to be allowed to proceed are further configured to check the status of said another one of the plurality of callers stored at the server.

39. The one or more computer-readable storage memory devices of claim 30, wherein the instructions are further configured to enable transmission of a video data stream from said one of the plurality of callers requesting to convert the communication session into a premium communication session in the premium communication session.

40. The one or more computer-readable storage memory devices of claim 39, wherein the processor-executable instructions are further configured to enable transmission a video data stream from said another one of the plurality of callers only in the premium communication session if said another one of the plurality of callers gives permission.

41. The one or more computer-readable storage memory devices of claim 30, wherein the processor-executable instructions are further configured to enable transmission of image data between the plurality of callers in the premium communication session, said image data either being captured using a webcam, or representing an image displayed on a caller's screen.

42. The one or more computer-readable storage memory devices of claim 30, wherein the processor-executable instructions to request permission from said determined another one of the plurality of callers are further configured to send a message to said determined another one of the plurality of callers, wherein the message includes the permission request.

* * * * *